(12) United States Patent
Ozturk et al.

(10) Patent No.: US 10,038,356 B2
(45) Date of Patent: Jul. 31, 2018

(54) GENERATOR ROTOR REFURBISHING SYSTEM AND METHOD OF REPAIRING A GENERATOR ROTOR

(75) Inventors: Ozgen Ozturk, Istanbul (TR); Murat Alver, Istanbul (TR); Nihan Basaran, Istanbul (TR); David Thomas Brockenbrough, Saratoga Springs, NY (US); Erkan Karakazan, Istanbul (TR); August Elwood Pendergast, Greenfield Center, NY (US); Zafer Tuncali, Istanbul (TR); Robert William Vadney, Scotia, NY (US); Yu Wang, Cohoes, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 335 days.

(21) Appl. No.: 13/617,549

(22) Filed: Sep. 14, 2012

(65) Prior Publication Data

US 2013/0312250 A1 Nov. 28, 2013

(30) Foreign Application Priority Data

May 22, 2012 (TR) .............................. a 2012 05940

(51) Int. Cl.
*B26D 7/08* (2006.01)
*H02K 15/02* (2006.01)
(Continued)

(52) U.S. Cl.
CPC .......... *H02K 15/0006* (2013.01); *B27B 5/188* (2013.01); *H02K 3/12* (2013.01);
(Continued)

(58) Field of Classification Search
CPC ......... H02K 15/006; H02K 3/12; B23P 23/00; F01D 25/002; Y10T 29/49012; Y10T 29/49821; Y10T 29/53283; Y10T 83/242
(Continued)

(56) References Cited

U.S. PATENT DOCUMENTS 618,952 A * 2/1899 Cretin ..................... B27B 5/188
83/486
897,488 A * 9/1908 Pescott ................ B23Q 9/0042
83/463
(Continued)

*Primary Examiner* — Joseph J Hail
*Assistant Examiner* — Arman Milanian
(74) *Attorney, Agent, or Firm* — Ernest G. Cusick; Hoffman Warnick LLC

(57) ABSTRACT

A generator rotor refurbishing system includes a cutting tool configured to cut generator rotor bars. The cutting tool includes a guide track configured and disposed to be fixedly mounted relative to a generator rotor and a cutting head block moveably mounted relative to the guide track. The cutting tool is configured and disposed to produce a fixed depth cut through a generator rotor bar. A cleaning system is configured for substantially simultaneously cleaning first and second opposing surfaces and first and second opposing edges of the generator rotor bar. The cleaning system includes a guide member and a cleaning assembly moveably mounted to the guide member. The cleaning assembly includes a plurality of cleaning members arranged to clean each of first and second opposing surfaces and first and second opposing edges of the generator rotor bar.

13 Claims, 7 Drawing Sheets

(51) Int. Cl.
*H02K 15/00* (2006.01)
*B27B 5/18* (2006.01)
*H02K 3/12* (2006.01)

(52) U.S. Cl.
CPC .... *Y10T 29/49012* (2015.01); *Y10T 29/53283* (2015.01); *Y10T 83/242* (2015.04); *Y10T 83/7768* (2015.04)

(58) Field of Classification Search
USPC ........ 451/65, 67, 73, 69, 70, 182, 184, 190, 451/195, 194, 188; 29/402.03, 402.04, 29/402.05, 402.06; 134/64 R, 122 R; 83/875–878
See application file for complete search history.

(56) References Cited

U.S. PATENT DOCUMENTS

| | | | |
|---|---|---|---|
| 2,214,141 A * | 9/1940 | Mall | B23D 45/006 451/121 |
| 2,688,347 A * | 9/1954 | Schmidt | B23Q 9/0028 30/373 |
| 2,710,417 A * | 6/1955 | Short | B27G 1/00 144/116 |
| 2,723,443 A * | 11/1955 | McKibben | 83/185 |
| 2,773,523 A * | 12/1956 | Hopla | B23Q 9/0014 269/290 |
| 3,046,707 A * | 7/1962 | Obear | B23D 45/003 125/13.01 |
| 3,232,159 A * | 2/1966 | Stanley | 83/175 |
| 3,434,514 A * | 3/1969 | McManama | 83/745 |
| 3,895,464 A * | 7/1975 | Kiser | 451/301 |
| 3,977,298 A * | 8/1976 | Linsinger | 409/138 |
| 4,106,390 A * | 8/1978 | Kodaira et al. | 91/42 |
| 4,144,638 A * | 3/1979 | Harris | 29/762 |
| 4,218,818 A * | 8/1980 | Panzica | 29/762 |
| 4,488,463 A * | 12/1984 | Pontarella | B23D 45/003 82/101 |
| 4,510,679 A * | 4/1985 | Aleem et al. | 29/598 |
| 4,564,543 A | 1/1986 | Ritter | |
| 4,611,521 A * | 9/1986 | McCardle | 83/796 |
| 4,630,407 A * | 12/1986 | Rhodes | 451/53 |
| 4,648,301 A * | 3/1987 | Scott | 83/464 |
| 4,726,274 A * | 2/1988 | Pitoni et al. | 83/745 |
| 4,739,688 A * | 4/1988 | Brennan et al. | 83/745 |
| 4,741,096 A | 5/1988 | Lee et al. | |
| 4,814,736 A | 3/1989 | Lee et al. | |
| 4,836,400 A | 6/1989 | Chaffey et al. | |
| 4,838,964 A | 6/1989 | Thomsen et al. | |
| 4,854,206 A * | 8/1989 | Wilfong | B27B 17/0083 83/574 |
| 4,873,902 A * | 10/1989 | Krieg | B23D 45/006 269/32 |
| 5,081,768 A * | 1/1992 | Brennan | B23D 21/04 30/101 |
| 5,085,719 A | 2/1992 | Eck | |
| 5,161,291 A * | 11/1992 | Guenther | 29/56.5 |
| 5,231,908 A * | 8/1993 | Skvarce et al. | 83/699.11 |
| 5,303,755 A * | 4/1994 | Poling | 144/286.5 |
| 5,330,299 A | 7/1994 | Gates | |
| 5,705,752 A | 1/1998 | Chang et al. | |
| 5,753,823 A | 5/1998 | Chang et al. | |
| 6,019,153 A | 2/2000 | Knokey | |
| 6,056,841 A | 5/2000 | Knokey | |
| 6,116,659 A | 9/2000 | Wagner | |
| 6,626,744 B1 * | 9/2003 | White et al. | 451/66 |
| 6,997,175 B2 * | 2/2006 | Kalb | B23D 45/024 125/10 |
| 7,128,662 B2 | 10/2006 | Kumamoto | |
| 7,138,600 B2 | 11/2006 | Kwon et al. | |
| 7,297,074 B2 | 11/2007 | Kumamoto | |
| 7,628,677 B1 * | 12/2009 | Branton et al. | 451/9 |
| 8,001,872 B2 * | 8/2011 | Gorrie | 81/3.4 |
| 9,533,430 B1 * | 1/2017 | Kalb | B28D 1/30 |
| 2007/0209495 A1 * | 9/2007 | Marcon | 83/875 |
| 2009/0229119 A1 * | 9/2009 | Dailey et al. | 29/762 |
| 2009/0265910 A1 * | 10/2009 | Vallarino | H02K 15/0006 29/426.4 |
| 2009/0324350 A1 * | 12/2009 | Clements et al. | 408/103 |
| 2010/0162560 A1 * | 7/2010 | Lape et al. | 29/764 |
| 2011/0032623 A1 * | 2/2011 | Ehnes et al. | 359/625 |

* cited by examiner

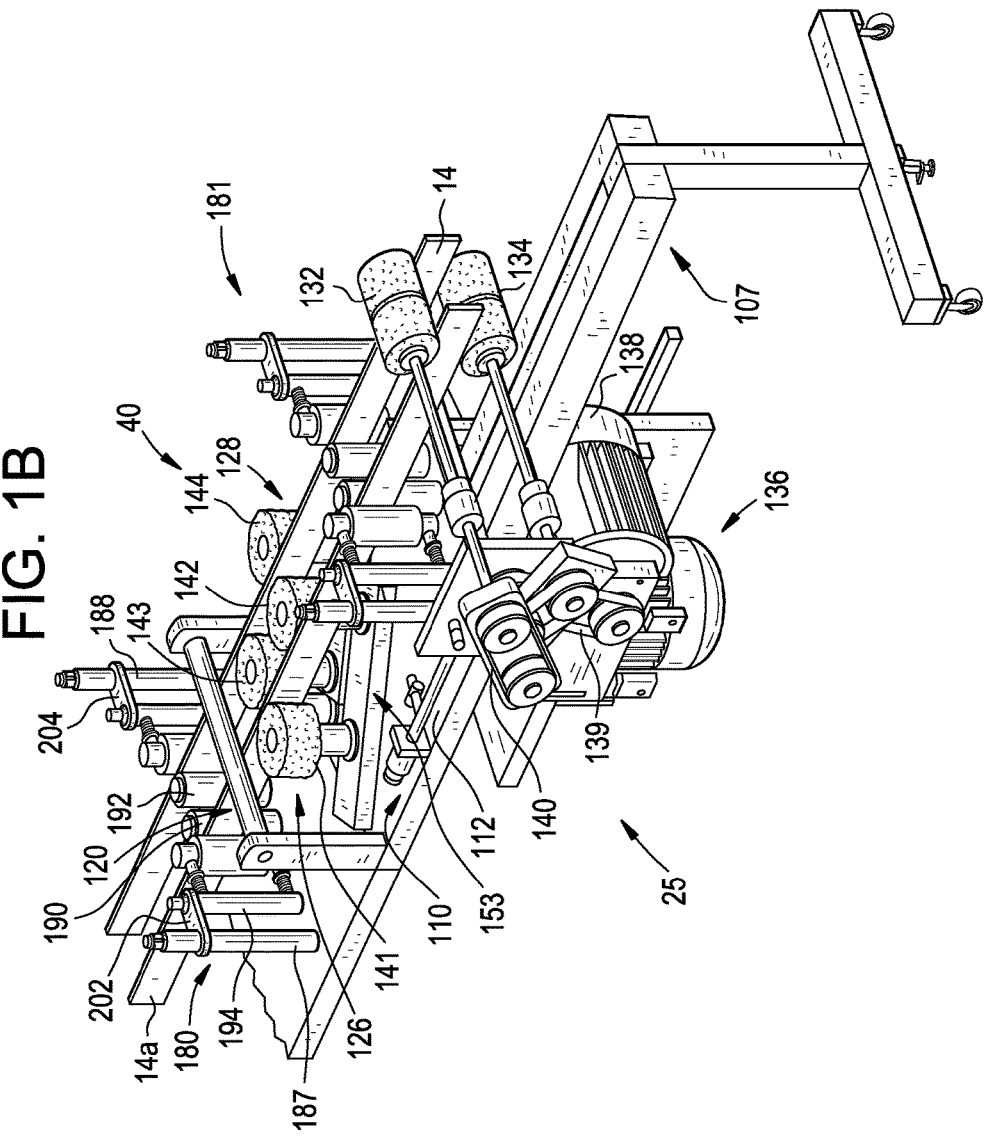

GENERATOR ROTOR REFURBISHING SYSTEM AND METHOD OF REPAIRING A GENERATOR ROTOR

CROSS REFERENCE TO RELATED APPLICATION

This application claims priority to Turkish Application No. 2011/07016 filed Jul. 15, 2011, the entire contents of which are incorporated herein by reference.

BACKGROUND OF THE INVENTION

The subject matter disclosed herein relates to the art of generators and, more particularly, to a generator rotor refurbishing system.

Generators typically include a stationary member or stator having a plurality of stator windings and a rotating member or rotor. The rotor includes a plurality of slots. Multiple conductors in the form of copper bars may be layered within each slot in the rotor. The copper bars are joined at corner regions through a brazing process to form a single multi-layered copper bar structure. Multiple multi-layered copper bar structures are joined together and nested one with another to form a "slinky-like" structure that defines a rotor coil. Each coil defines two or more field coil poles. Each field coil pole may include up to ten or more coils. As part of a generator repair process, the copper bars are removed, cleaned, and re-installed into the slots.

Removing the coils generally involves a team of support personnel and is initiated by cutting various ones of the copper bars of the multi-layered copper bar structure to separate one coil from another. Once cut and separated, the coil is removed as a single unit having a form that is similar to that of a loosely coiled spring. The coil, in its entirety is then moved to a cleaning area. In the cleaning area, operators employ a sand blasting process to remove varnish/epoxy and other surface fouling such as oxidation and the like. After cleaning, the team of support personnel re-installs the coil into the slots. The copper bars are then reconnected to re-establish a connection to the adjacent coil to re-form the multi-layer copper bar structure.

BRIEF DESCRIPTION OF THE INVENTION

According to one aspect of the exemplary embodiment, a generator rotor refurbishing system includes a cutting tool configured to cut generator rotor bars. The cutting tool includes a guide track configured and disposed to be fixedly mounted relative to a generator rotor and a cutting head block moveably mounted relative to the guide track. The cutting tool is configured and disposed to produce a fixed depth cut through a generator rotor bar. A cleaning system is configured for substantially simultaneously cleaning first and second opposing surfaces and first and second opposing edges of the generator rotor bar. The cleaning system includes a guide member and a cleaning assembly moveably mounted to the guide member. The cleaning assembly includes a plurality of cleaning members arranged to clean each of first and second opposing surfaces and first and second opposing edges of the generator rotor bar.

According to another aspect of the exemplary embodiment, a generator rotor refurbishing system includes a cleaning system configured for substantially simultaneously cleaning first and second opposing surfaces and first and second opposing edges of the a generator rotor bar. The cleaning system includes a guide member and a cleaning assembly moveably mounted to the guide member. The cleaning assembly includes a plurality of cleaning members arranged to clean each of the first and second opposing surfaces and the first and second opposing edges of the generator rotor bar.

According to yet another aspect of the exemplary embodiment, a method of refurbishing a generator rotor includes positioning a guide track supporting a cutting tool on the generator rotor, guiding a cutting head of the cutting tool along the guide track to make a fixed depth cut in a generator rotor bar, removing the generator rotor bar from the generator rotor in a C-form, positioning the generator rotor bar on a cleaning system having a plurality of cleaning members, and moving the plurality of cleaning members along the generator rotor bar to substantially simultaneously clean all generator rotor bar surfaces.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1B is a partial perspective view of a copper bar cleaning system in accordance with an exemplary embodiment;

The detailed description explains embodiments of the invention, together with advantages and features, by way of example with reference to the drawings.

DETAILED DESCRIPTION OF THE INVENTION

Figure 1A:
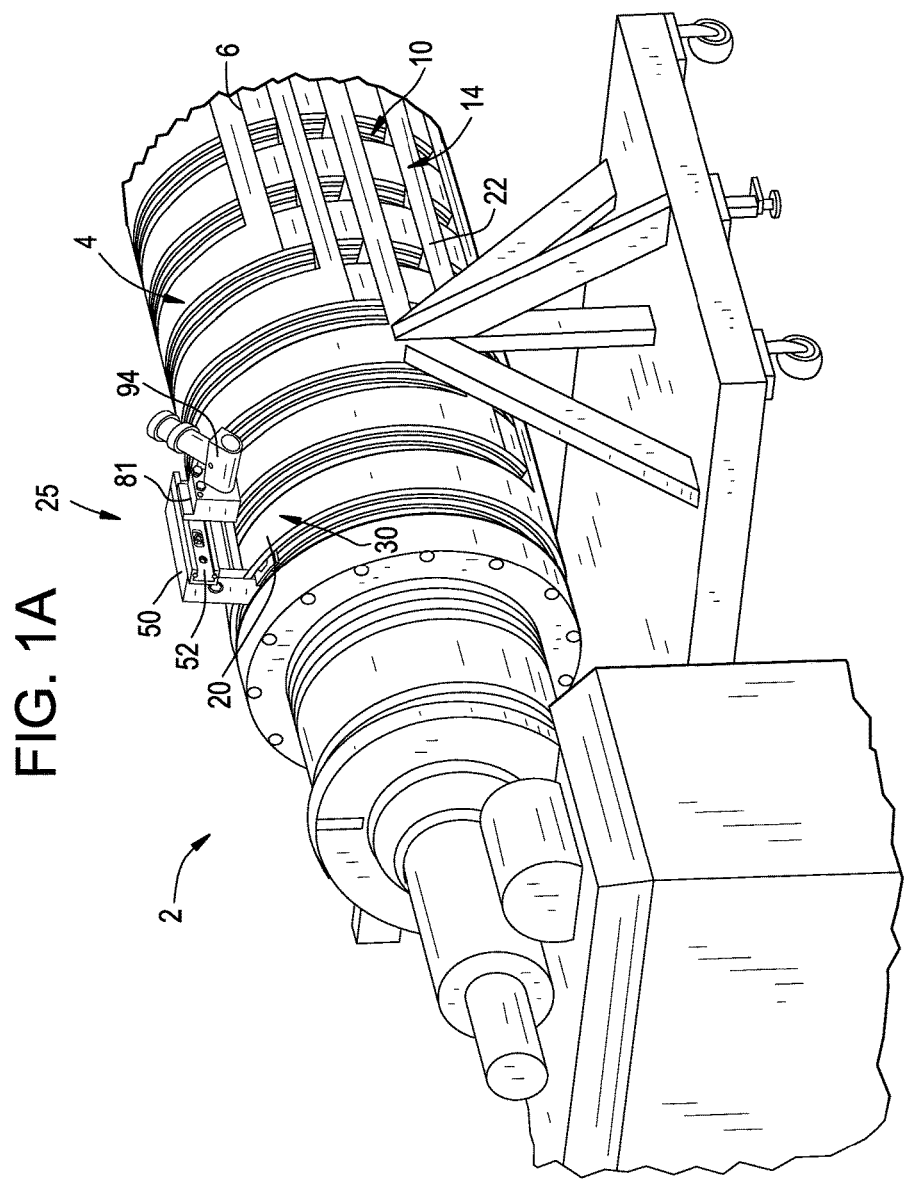
FIG. 1A is a partial perspective view of a generator rotor, and copper bar cutting tool in accordance with an exemplary embodiment.
Figure 2:
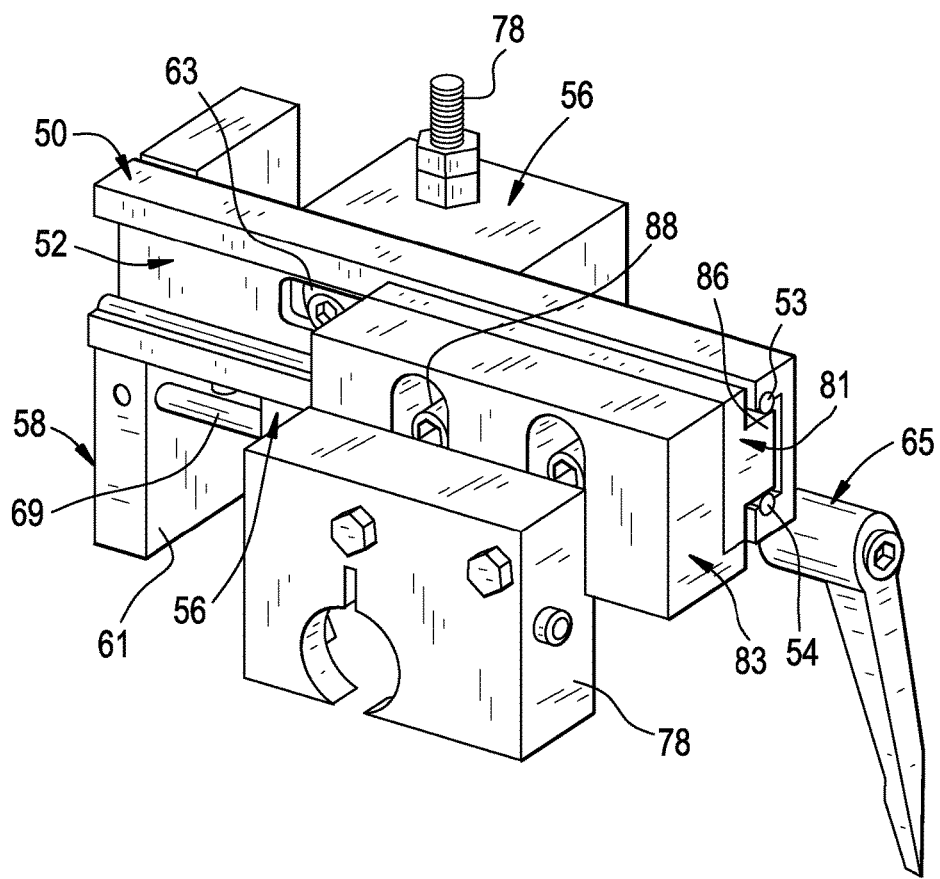
FIG. 2 is a perspective view of a portion of the cutting tool of FIG. 1A.
Figure 3:
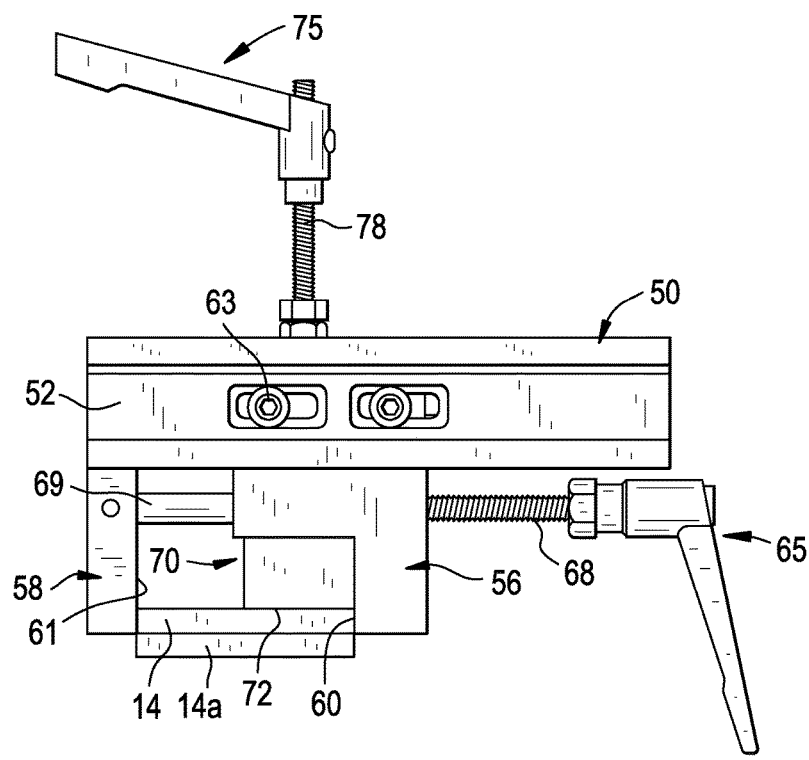
FIG. 3 is a side plan view of the cutting tool of FIG. 2.

With reference to FIGS. 1A and 1B, a generator rotor in accordance with an exemplary embodiment is indicated generally at 2. Generator rotor 2 includes a rotor body 4 having a plurality of slots 6 which, as will be discussed more fully below, support multi-layered coils 10. Multi-layered coils 10 include a plurality of interconnected conductors shown in the form of copper bars 14. Copper bars 14 include a curvilinear portion 20 that wrap about a half of rotor body 4 to form a pole, and a substantially linear portion 22 that pass through slots 6 along rotor body 4. Over time, copper bars 14 obtain a surface tarnish or the like that reduces generator efficiency. In order to restore generator rotor 2, copper bars 14 are removed, cleaned, and re-installed. In contrast to prior art arrangements in which the coils are removed as a single, continuous unit, the present embodiment describes a system that cuts multi-layered coils 10 to separate copper bars 14 to facilitate removal from rotor 2. After cutting, copper bars 14 are then processed or cleaned to remove surface tarnishing as will be discussed more fully below. Accordingly, the exemplary embodiment is directed to a generator rotor refurbishing system 25 that includes a cutting tool 30 (FIG. 1A) and a cleaning system 40 (FIG. 1B).

As best shown in FIGS. 2-5, cutting tool 30 includes a guide track 50 which, as will be discussed more fully below, is fixedly mounted relative to rotor body 4. Guide track 50 includes a guide slot 52 having opposing rib elements 53 and 54. As will become more fully evident below, rib elements 53 and 54 facilitate movement and alignment along guide slot 52. Cutting tool 30 further includes a main block 56 and a clamping block 58. Main block 56 includes a clamping surface portion 60 and clamping block 58 includes a clamping surface section 61. Clamping surface portion 60 and clamping surface section 61 are brought together to secure guide track 50 to copper bar 14. Specifically, main block 56 is fixedly mounted to guide track 50 through a pair of fasteners, one of which is indicted at 63, that pass through a recess (not separately labeled) formed in guide slot 52. Clamping block 58 is operatively connected to a clamping block adjustment member 65. Clamping block adjustment member 65 is coupled to a threaded rod 68 that is rotated to shift clamping block 58 along guide track 50. In addition to threaded rod 68, clamping block 58 travels along guide rods, one of which is shown at 69 in FIG. 2, to maintain alignment.

In accordance with the exemplary embodiment, cutting tool 30 also includes a surface contact block 70 moveably mounted relative to main block 56. Surface contact block 70 includes a surface contact zone 72 that is guided into contact with one of copper bars 14 through manipulation of surface contact block adjustment member 75. Surface contact block adjustment member 75 is coupled to a threaded rod 78. Threaded rod 78 is rotated to shift surface contact block 70 relative to main block 56. Surface contact block 70 is moved into contact with a first one of copper bars 14 to enhance an overall stability of cutting tool 30.

Figure 4:
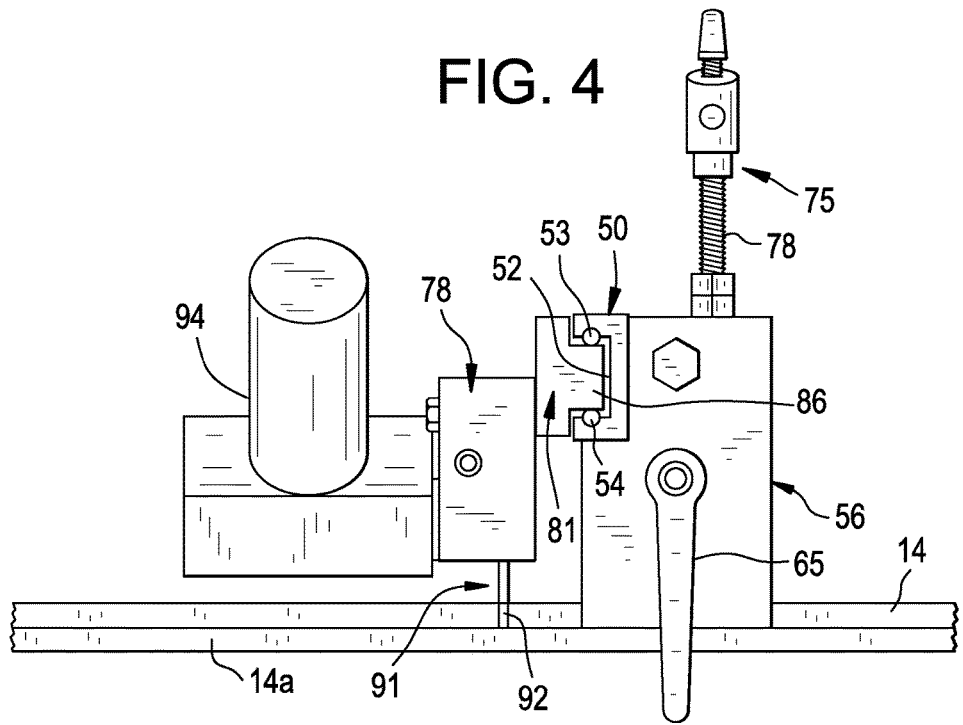
FIG. 4 is a front plan view of the cutting tool of FIG. 2 shown without an adjustment block cutting through a first copper bar layer.
Figure 5:
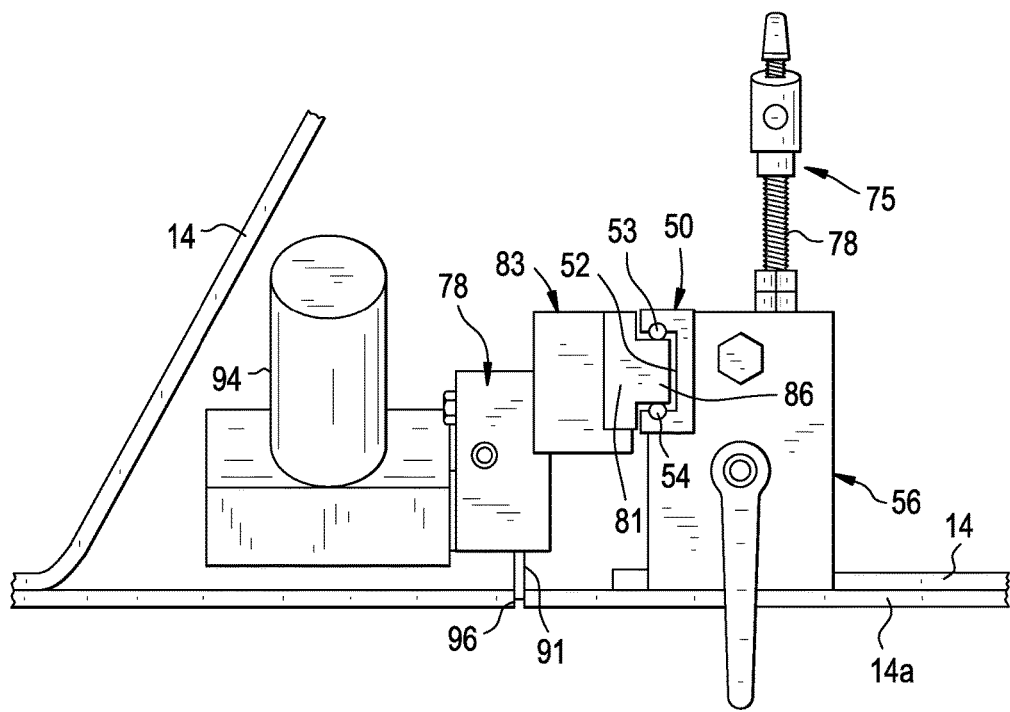
FIG. 5 is a front plan view of the cutting tool of FIG. 2 shown with the adjustment block cutting through a second copper bar layer.

Cutting tool 30 is further shown to include a cutting head block 78 that is moveably mounted relative to guide track 50. Cutting head block 78 is coupled to guide track 50 through a guide block 81 when making an initial cut through copper bar 14 such as shown in FIG. 4 as will be discussed more fully below. Cutting head block 78 is later coupled to guide block 81 through a lap or adjustment block 83 when cutting through another one of copper bars 14a as shown in FIG. 5. Guide block 81 includes a slot member 86 that extends into guide slot 52. A plurality of wheels (not shown) is mounted to slot member 86. The wheels travel along rib elements 53 and 54. The wheels are configured to partially extend about rib elements 53 and 54 to maintain alignment of cutting head block 78 relative to guide track 50 to facilitate a cut that is generally perpendicular, e.g. square, to outer edges (not separately labeled) of copper bar 14.

As discussed above, after cutting through a first one of copper bars 14, adjustment block 83 is installed between cutting head block 78 and guide block 81. Adjustment block 83 is shiftably mounted relative to guide block 81 by a pair of adjustment block fasteners, one of which is indicated at 88. In this manner, adjustment block 83 may be shifted relative to guide block 81 to move cutting head block 78 relative to guide block 81 to perform a cutting operating on the another one of copper bars 14a. Cutting head block 78 includes a blade element 91 that is deployed to cut through copper bars 14 and 14a as will be detailed more fully below.

Blade element 91 is deployed through manipulation of a blade control 94. Blade control 94 extends blade element 91 into and out from cutting bead block 78 a fixed length to achieve a fixed depth, substantially square cut 92 that does not penetrate into an adjacent, lower, copper bar 14a. In addition, blade element 91 is relatively thin so as to produce a relatively clean thin kerf that does not remove much copper material or lead to smearing of copper when producing the cut. A thin kerf facilitates re-joining copper bars 14 following a cleaning operation. That is, the thin kerf enhances braze quality when rejoining copper bars 14. After the initial cutting operation, copper bar 14 is folded or bent out of the way and adjustment block 83 is installed to off-set blade 91 relative to first cut 92. Adjustment block 83 also allows cutting head block 78 to be lowered to copper bar 14a. At this point, blade element 91 is deployed to perform a second cutting operation creating a second cut 96 in lower copper bar 14a. Adjustment block 83 provides radial adjustment and an axial adjustment for cutting head 78. In this manner, the first and second cutting operations produce a lap-type joint when re-connecting copper bars 14 and 14a.

With this arrangement, guide track 50 need only be mounted to rotor body 4 once to make two distinct cuts. More specifically, a first cutting system (not separately labeled) set up as shown in FIG. 4 may be employed for the first cutting operation. After the first cutting operation, a second cutting system (also not separately labeled) set up to include adjustment block 83 as shown in FIG. 5, may be mounted to guide track 50 to perform the second cutting operation. The use of two cutting systems reduces set up time for each cutting operation. After cutting, copper bars 14 and 14a are in a C-form, e.g., disconnected from adjacent ones of the multilayered coils, to facilitate removal from rotor body 4. After removal from rotor body 4, copper bars 14 are processed to remove surface tarnishing as will be discussed more fully below.

Figure 6:
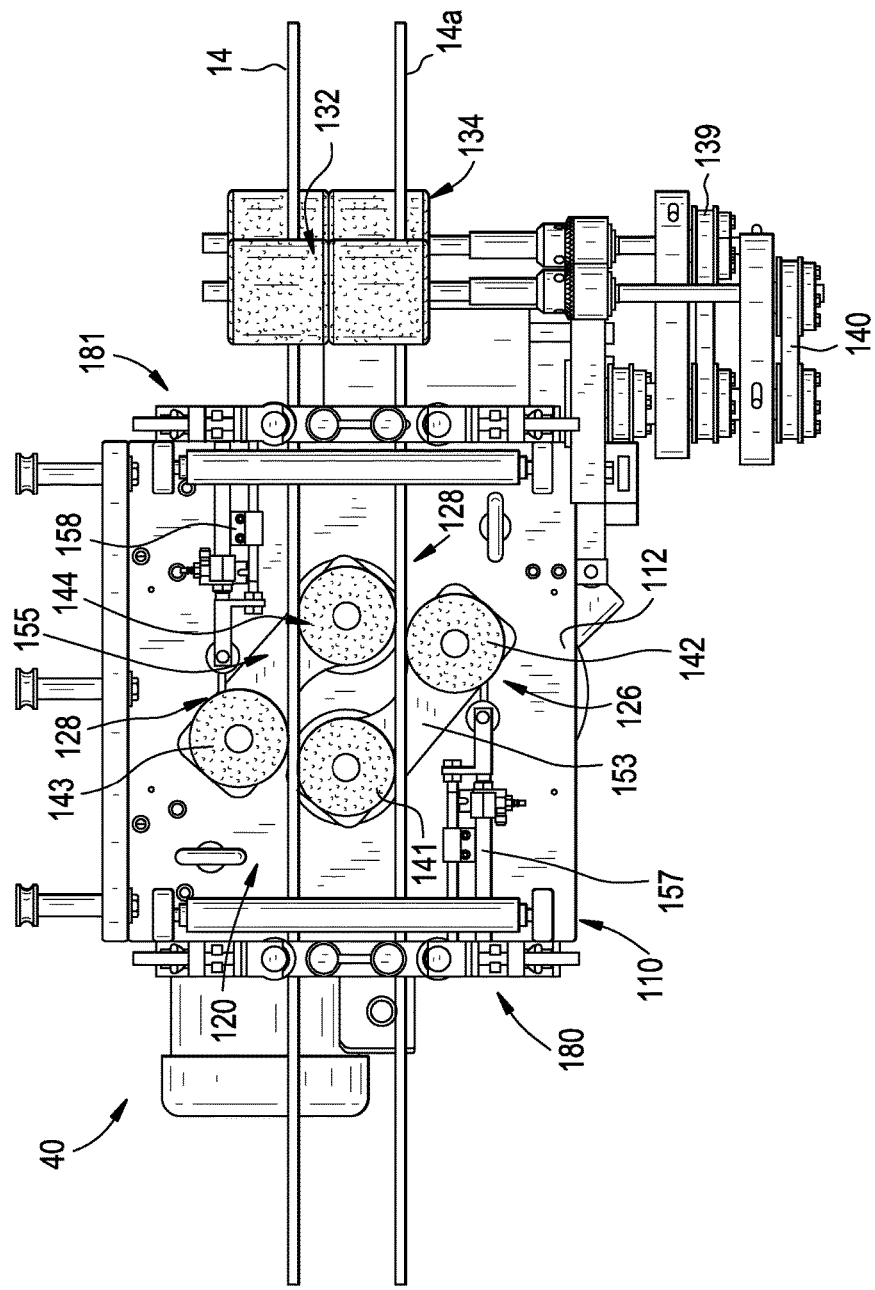
FIG. 6 is a top plan view of the cleaning system of FIG. 1B.

Copper bars 14 are secured to cleaning system 40. As shown in FIGS. 1B and 6, cleaning system 40 includes a guide member 107 (FIG. 1B) that is longer than copper bars 14. A support platform 110 is moveably supported to guide member 107. Support platform 110 includes a substantially horizontal planar surface 112 that is driven along guide member 107 by a drive system (not shown). Support platform 110 includes a cleaning assembly 120 arranged so as to remove surface tarnishing from all surfaces of one or more copper bars 14. In the illustrated embodiment, cleaning system 40 is configured to support and clean all surfaces of two copper bars 14 in a single cleaning operation.

In accordance with the exemplary embodiment, cleaning assembly 120 includes a first plurality of cleaning members 126 arranged to clean copper bar 14 and a second plurality of cleaning members 128 arranged to clean copper bar 14a. In addition to first and second pluralities of cleaning members 126 and 128, cleaning system 40 includes a first edge cleaning member 132 and a second edge cleaning member 134. First and second edge cleaning members 132 and 134 are configured to clean first and second, opposing outer edges of copper bars 14 and 14a. First and second pluralities of cleaning members 126 and 128 are operatively connected to a first drive member 136 mounted to support platform 110. First and second edge cleaning members 132 and 134 are operatively connected to a second drive member 138 mounted to support platform 110. Second drive member 138 is coupled to first and second edge cleaning members 132 and 134 through a first drive belt 139 and a second drive belt 140.

In further accordance with the exemplary embodiment, first plurality of cleaning members 126 includes a first cleaning member 141 and a second cleaning member 142. Second plurality of cleaning members 128 includes a third cleaning member 143 and a fourth cleaning member 144. Cleaning members 141, 142 and 143, 144 are shown in the form of abrasive discs. However, it should be understood, that cleaning members 141, 142, and 143, 144 could take on a variety of forms. First and second cleaning members 141 and 142 are mounted to a first adjustment member 153 while third and fourth cleaning members 143 and 144 are mounted to a second adjustment member 155. First and second adjustment members 153 and 155 are moveably mounted to support platform 110. A first linear actuator 157 is coupled to first adjustment member 153 and a second linear actuator 158 is coupled to second adjustment member 155. First linear actuator 157 is selectively activated to shift first adjustment member 153 across support platform 110 to guide cleaning members 141 and 142 into contact with surfaces copper bars 14 and 14a. Similarly, second linear actuator 158 is selectively activated to shift second adjustment member 155 across support platform 110 to guide cleaning members 143 and 144 into contact with opposing surfaces copper bars 14 and 14a. Linear actuators 157 and 158 are shown in the form of pneumatic actuators. However, it should be understood, that linear actuators may take on a variety of forms including hydraulic actuators, mechanical actuators, and the like. After cleaning, copper bars 14 and 14a are re-installed to rotor body 4. Once in position on rotor body 4, copper bars 14 and 14a are brazed to restore a connection that was cut by blade element 91.

Figure 7:
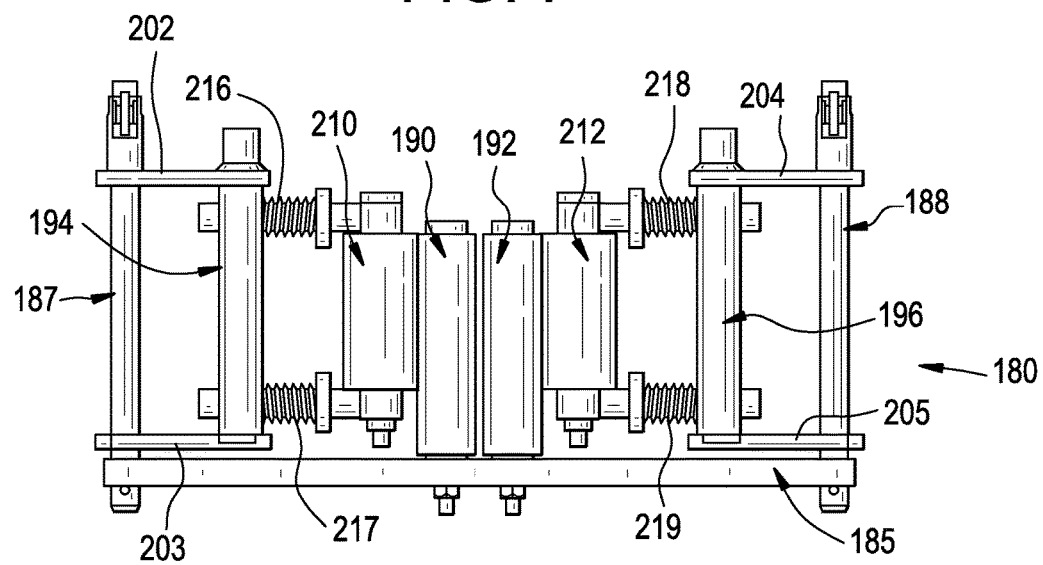
FIG. 7 is a plan view of a copper guide system in accordance with one aspect of the exemplary embodiment.

In further accordance with the exemplary embodiment, cleaning system 40 includes first and second copper guide systems 180 and 181 that align and position copper bars 14 and 14a for cleaning assembly 120. As each copper guide system 180 and 181 is substantially similarly formed, a detailed description will be made with reference to FIG. 7 in describing copper guide system 180 with an understanding that copper guide system 181 includes similar structure.

Copper guide system 180 includes a base member 185 that supports first and second support elements 187 and 188 as well as first and second stationary rollers 190 and 192. Support elements 187, 188 and stationary rollers 190, 192 extend substantially perpendicularly from base member 185. Stationary rollers should be understood to mean rollers that rotate but that do not translate relative to base member 185. Support elements 187 and 188 are coupled to respective first and second pivoting members 194 and 196. More specifically pivoting member 194 is coupled to support element 187 through first and second hinge elements 202 and 203 and second pivoting member 196 is coupled to support element 188 through third and fourth hinge elements 204 and 205. Pivoting members 194 and 196 moveably support respective first and second moveable rollers 210 and 212. Moveable rollers 210 and 212 are biased toward copper bars 14 and 14a though spring elements 216-219. With this arrangement, moveable rollers 210 and 212 are moved to urge copper bars 14 and 14a into contact with stationary rollers 190, 192 to establish a desired alignment for cleaning assembly 120.

Figure 8:
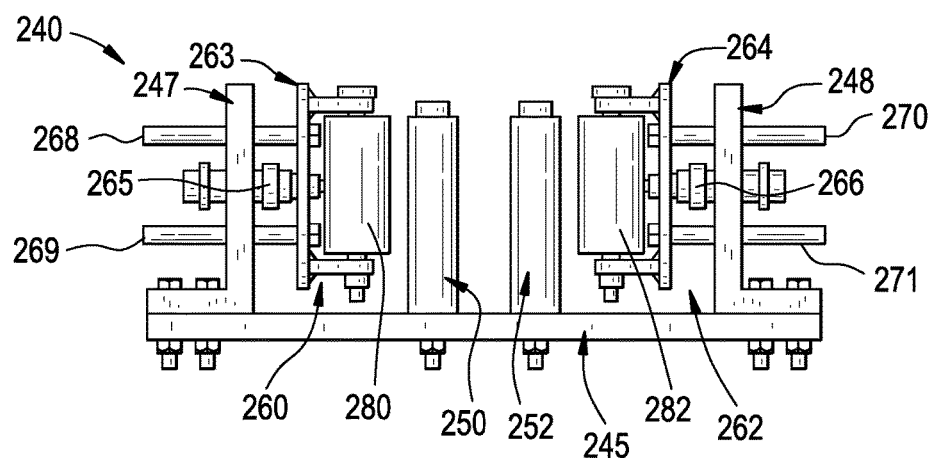
FIG. 8 is a plan view of a copper guide system in accordance with another aspect of the exemplary embodiment.

FIG. 8 illustrates a copper guide system 240 in accordance with another aspect of the exemplary embodiment. Copper guide system 240 includes a base member 245 that supports first and second support elements 247 and 248 as well as first and second stationary rollers 250 and 252. Support elements 247, 248 and stationary rollers 250, 252 extend substantially perpendicularly from base member 245. Stationary rollers should be understood to mean rollers that rotate but that do not translate relative to base member 245. Copper guide system 240 is also shown to include first and second adjustment members 260 and 262. Adjustment members 260 and 262 include respective first and second roller supports 263 and 264 that are shiftably mounted relative to support elements 247 and 248 respectively. First adjustment member 260 is coupled to support element 247 through a first linear actuator 265 and second adjustment member 262 is coupled to support element 248 through a second linear actuator 266. First adjustment member 260 is also coupled to support element 247 through first and second guide elements 268 and 269. Similarly, second adjustment member 262 is coupled to support element 248 through third and fourth guide elements 270 and 271. First and second roller supports 263, 264 include corresponding first and second moveable rollers 280 and 282 that are guided into contact with copper bars 14 and 14a. With this arrangement, moveable rollers 280, 282 are shifted to urge copper bars 14 and 14a into contact with stationary rollers 250, 252 to establish a desired alignment for cleaning assembly 120

At this point it should be understood that the exemplary embodiments provide a system for easily removing and cleaning copper bars that form a field coil for a generator. It should also be understood that while discussed in connection with cutting copper bars, the generator rotor refurbishing system may be employed to cut and clean rotor bars made from a variety of materials. The cutting tool facilitates removal of single lengths of copper bar. While described as being used in connection with a multi-layer generator rotor, the exemplary embodiments may also be employed when serving a generator having a single layered rotor. Regardless, once removed, the single lengths of copper bar are then processed by the cleaning system of the exemplary embodiment. In this manner, cutting the copper bar(s) into single manageable lengths reduces the number of personnel necessary to refurbish the field coil. Moreover, the single lengths of copper bars may be more easily cleaned. The single lengths of copper bar are supported at the cleaning system, and once in position, the cleaning members are moved along the copper bar(s). The cleaning members substantially, simultaneously, clean all external surfaces of the copper bar(s). Once cleaned, the copper bar(s) may be re-installed to the rotor. It has been shown that the present invention may reduce the number of personnel required to remove and clean the copper bar(s) from a team of ten or more individuals to as few as two individuals thereby simplifying and reducing an overall cost associated with rotor refurbishment.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A generator rotor refurbishing system comprising:
    a cutting tool configured to cut generator rotor bars, the cutting tool including:
        a guide track configured and disposed to be fixedly mounted relative to a generator rotor;
        a cutting head block moveably mounted relative to the guide track, the cutting head block including a blade element movable in a direction substantially perpendicular to the movement of the cutting block head within the guide track to achieve a first fixed depth, substantially square cut; and
        an adjustment block adapted for installation between the cutting block head and the guide track,
    whereby the cutting tool is configured and disposed for a second cutting operation to produce a second cut through another generator bar arranged below the generator rotor bar without moving the guide track, the second cut being laterally and axially off-set from the first cut.

2. The generator rotor refurbishing system according to claim 1, wherein the second cut comprises a second fixed depth substantially square cut.

3. The generator rotor refurbishing system according to claim 1, wherein cutting tool includes a main block and a clamping block mounted to the guide track, the main block being configured and disposed to cooperate with the clamping block to grip a generator rotor bar.

4. The generator rotor refurbishing system according to claim 3, wherein the cutting tool includes a surface contact block mounted to the main block, the surface contact block being configured and disposed to rest upon a generator rotor bar.

5. The generator rotor refurbishing system according to claim 4, wherein the cutting tool includes a surface contact block adjustment member configured and disposed to shift the surface contact block relative to the main block.

6. A generator rotor refurbishing system comprising:
    a cutting tool configured to cut generator rotor bars, the cutting tool including:
        a clamping apparatus comprising a first clamping surface and a second clamping surface;
        a guide track configured and disposed to be fixedly mounted relative to a generator rotor;
        a cutting head block moveable along the guide track perpendicular to the first clamping surface and the second clamping surface and including a blade element movable in a direction substantially perpendicular to the movement of the cutting block head within the guide track to achieve a first fixed depth, substantially square cut; and
        an adjustment block adapted for installation between the cutting block head and the guide track,
    whereby the cutting tool is configured and disposed for a second cutting operation to produce a second cut through another generator bar arranged below the generator rotor bar without moving the guide track, the second cut being laterally and axially off-set from the first cut.

7. The generator rotor refurbishing system of claim 1, further comprising:
    a guide block disposed between the cutting head block and the guide track, the guide block including a slot member.

8. The generator rotor refurbishing system of claim 7, wherein the guide track includes a guide slot into which the slot member extends.

9. The generator rotor refurbishing system of claim 8, further comprising:
    a pair of rib elements disposed between the slot member and a surface of the guide slot.

10. The generator rotor refurbishing system of claim 6, further comprising:
    a guide block disposed between the cutting head block and the guide track, the guide block including a slot member.

11. The generator rotor refurbishing system of claim 10, wherein the guide track includes a guide slot into which the slot member extends.

12. The generator rotor refurbishing system of claim 11, further comprising:
    a pair of rib elements disposed between the slot member and a surface of the guide slot.

13. A cutting tool comprising:
    a guide track including a guide slot;
    a cutting head block moveably mounted relative to the guide track, the cutting head block including a straight-edged blade element movable in a direction substantially perpendicular to the movement of the cutting block head within the guide track, the straight-edged blade element being configured and disposed to produce a first fixed depth cut;
    a guide block disposed between the cutting head block and the guide track, the guide block including a slot member extending into the guide slot;
    a pair of rib elements disposed between the slot member and a surface of the guide slot; and
    an adjustment block adapted for installation between the cutting block head and the guide track,
    whereby the cutting tool is configured and disposed for a second cutting operation to produce a second cut through another generator bar arranged below the generator rotor bar without moving the guide track, the second cut being laterally and axially off-set from the first cut.

* * * * *